United States Patent
Sengupta

(10) Patent No.: US 7,890,548 B2
(45) Date of Patent: Feb. 15, 2011

(54) AUTOMATION PROCESS SYSTEM AND METHOD TO UPGRADE FROM NON-UNICODE TRANSFORMATION SUPPORT TO UNICODE DATA TRANSFORMATION SUPPORT

(75) Inventor: Sandipan Sengupta, West Bengal (IN)

(73) Assignee: International Business Machines Corporation, Armonk, NY (US)

( * ) Notice: Subject to any disclaimer, the term of this patent is extended or adjusted under 35 U.S.C. 154(b) by 400 days.

(21) Appl. No.: 12/017,606

(22) Filed: Jan. 22, 2008

(65) Prior Publication Data

US 2009/0187601 A1 Jul. 23, 2009

(51) Int. Cl.
G06F 17/30 (2006.01)

(52) U.S. Cl. ............ 707/803; 707/790; 707/791; 707/792; 707/797; 707/E17.009; 707/999.1; 707/999.101; 707/999.102

(58) Field of Classification Search .......... None
See application file for complete search history.

(56) References Cited

U.S. PATENT DOCUMENTS

| 5,793,381 | A | 8/1998 | Edberg et al. | |
|---|---|---|---|---|
| 6,204,782 | B1 * | 3/2001 | Gonzalez et al. | 341/90 |
| 6,996,589 | B1 * | 2/2006 | Jayaram et al. | 1/1 |
| 7,051,278 | B1 | 5/2006 | Ehrman | |
| 7,171,432 | B2 * | 1/2007 | Wildhagen et al. | 1/1 |
| 2003/0023637 | A1 * | 1/2003 | Halahmi | 707/523 |
| 2004/0181776 | A1 | 9/2004 | Atkin et al. | |
| 2005/0144166 | A1 * | 6/2005 | Chapus et al. | 707/6 |
| 2005/0245241 | A1 * | 11/2005 | Durand et al. | 455/414.1 |
| 2006/0259456 | A1 * | 11/2006 | Falk et al. | 707/2 |
| 2007/0078839 | A1 | 4/2007 | Teodoro et al. | |
| 2007/0140451 | A1 * | 6/2007 | Altberg et al. | 379/114.13 |
| 2007/0192385 | A1 * | 8/2007 | Prahlad et al. | 707/202 |
| 2008/0168109 | A1 * | 7/2008 | Gaurav et al. | 707/203 |

OTHER PUBLICATIONS

"Release Notes for WebSphere Transformation Extender", V8.1.0.2, IBM Websphere Transformation Extender, Version 8.1, Service Pack 2, 2006.

* cited by examiner

*Primary Examiner*—Don Wong
*Assistant Examiner*—Andalib F Lodhi
(74) *Attorney, Agent, or Firm*—John Pivnichny; Roberts Mlotkowski Safran & Cole, P.C.

(57) ABSTRACT

A system and method for automatically transforming non-Unicode supporting files into Unicode supporting files via one or more reusable maps. The system comprises a reusable source type tree organized from a schema, wherein the schema is created from a file; and one or more reusable maps, structured to automatically map one or more rules onto the reusable source type tree to transform the reusable source type tree into a reusable target type tree. The method comprises determining a type of data to be supported; defining one or more rules to support the type of data; and applying the one or more rules automatically to a reusable source type tree to transform the reusable source type tree into a reusable target type tree.

20 Claims, 6 Drawing Sheets

AUTOMATION PROCESS SYSTEM AND METHOD TO UPGRADE FROM NON-UNICODE TRANSFORMATION SUPPORT TO UNICODE DATA TRANSFORMATION SUPPORT

FIELD OF THE INVENTION

The invention generally relates to a system and method for transforming non-Unicode supporting files into Unicode supporting files and, in particular, to a system and method for automatically transforming non-Unicode supporting files via one or more reusable maps.

BACKGROUND OF THE INVENTION

As the world becomes more globalized, the need to communicate with people in different countries using different languages increases. Also, given today's society, and the difficulty of speaking in different languages with people multiple time zones away, much of today's communication is done in writing. While people can easily handwrite characters in different languages, it is more difficult to integrate the many different characters used in writing systems throughout the world into a uniform system that can be used to type the characters on a computer.

Many attempts have been made to encode characters used in writing systems throughout the world. Over the years, a standard known as Unicode has become the leading industry standard for encoding these writing systems. Unicode works by encoding characters within a writing system into hexadecimal format, which allows for a character to be consistently represented by a unique hexadecimal value. However, since not all of the writing systems were originally encoded in a Unicode format, it becomes necessary at times to map one or more characters from a non-Unicode supporting format to a Unicode supporting format.

Currently, non-Unicode supporting formats have been transformed into Unicode supporting formats using parsers. A parser is a program, or part of a program, which obtains a string (e.g., a block of text) and identifies the structure of the string based on a set of rules. Once the structure is obtained, a new rule can be applied to the string to change the string. For example, a parser could be used to locate data types that are defined as Single (i.e., those data types storing up to four bytes of data) and change them to a Double (i.e., a data type capable of storing up to eight bytes of data). While parsers may be used to change strings into a Unicode supporting format, it becomes problematic to use parsers when entire serially linked type definition files, or applications, need to be converted from non-Unicode supporting formats to Unicode supporting formats. The problem lies in the fact that additional manual activities of code change, or configuration setting changes such as using parsers and change of type definition properties, e.g., single byte to double byte, need to be implemented manually for each applicable type definition. For example, one type definition file may be used to define thousands of data types and an application may be built around multiple type definition files.

More specifically, a serially linked application is when a first application outputs data and a second application directly picks up the output of the first application. Examples of serially linked applications include many implementations of enterprise application integration (EAI) software. The problem with using a parser on serially linked applications is that all of the applicable data structures would have to be changed in middleware to avoid complications from transferring an output from a first application having already been converted from a non-Unicode supporting format to a serially linked second application that has not yet been converted from a non-Unicode supporting format. To make a parser work in this kind of situation would require substantial changes to a system's architecture, which is costly and time consuming. Similarly, manual changes, or replacing an entire system, would also be costly and time consuming.

Accordingly, there exists a need in the art to overcome the deficiencies and limitations described hereinabove.

SUMMARY OF THE INVENTION

In a first aspect of the invention, a system comprises a reusable source type tree organized from a schema, wherein the schema is created from a file. This aspect also includes one or more reusable maps structured to automatically map one or more rules onto the reusable source type tree to transform the reusable source type tree into a reusable target type tree.

In another aspect of the invention, a method for transforming files comprises determining a type of data to be supported, defining one or more rules to support the type of data, and applying the one or more rules automatically to a reusable source type tree to transform the reusable source type tree into a reusable target type tree.

In another aspect of the invention, a system for deploying an application for converting non-Unicode files to Unicode files comprises a computer infrastructure being operable to: determine a type of data to be supported; define one or more rules to support the type of data; and apply the one or more rules automatically to a reusable source type tree, wherein the reusable source type tree includes a schema that is created from a file.

In yet another aspect of the invention, a computer program product comprises a computer usable medium having computer readable program code embodied in the medium to: create a reusable source type tree from a file and apply one or more reusable maps having one or more rules onto the reusable source type tree to transform the reusable source type tree into a reusable target type tree.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF EMBODIMENTS OF THE INVENTION

The invention is directed to a method and system for automatically transforming non-Unicode supporting files into Unicode supporting files via one or more reusable maps. By implementing the method and system of the invention, it becomes possible for an entire file or application to be converted from a non-Unicode supporting format to a Unicode supporting format. This permits entire serially linked files or applications to be converted to support Unicode files without having to change a system's architecture.

Additionally, the invention also permits the transformation of non-Unicode supporting files to Unicode supporting files to be automated. Therefore, a non-Unicode supporting file can be automatically exported to an automation process component, which transforms the non-Unicode supporting file into a file that is capable of supporting Unicode. As part of the automation process, the reusable maps and the one or more rules used to define the reusable maps may also be automatically updated or changed to provide for better reusable maps.

System Environment

Figure 1:
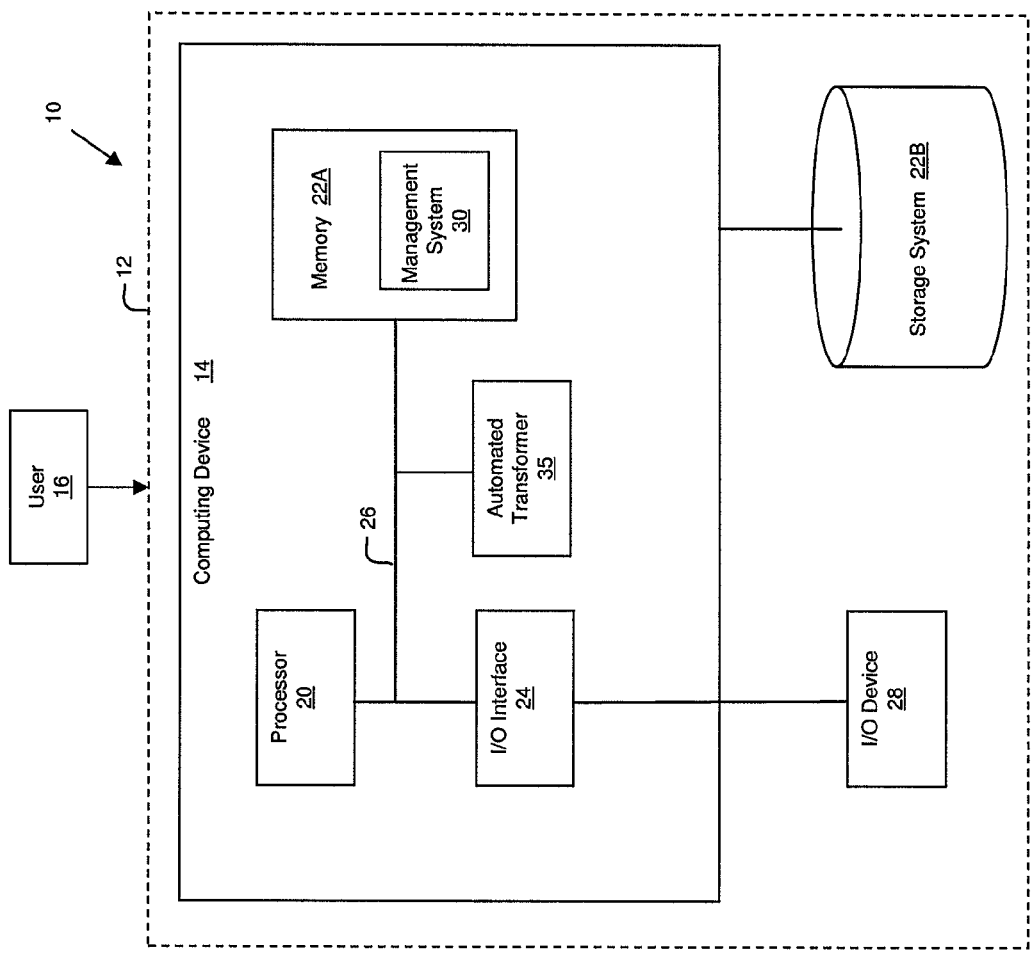
FIG. 1 shows an illustrative environment for implementing the process in accordance with the invention.

FIG. 1 shows an illustrative environment 10 for managing the processes in accordance with the invention. To this extent, the environment 10 includes a server 12 that can perform the processes described herein. In particular, the server 12 includes a computing device 14 that comprises a management system 30, which makes computing device 14 operable to automatically transform non-Unicode supporting files into Unicode supporting files via an automated transformer 35. As discussed herein, a user 16 can, e.g., add reusable Mercator maps or alter existing Mercator maps via the computing device 14 in order to aid the automated transformer 35 in transforming non-Unicode supporting files into Unicode supporting files.

The computing device 14 includes a processor 20, a memory 22A, an input/output (I/O) interface 24, and a bus 26. The memory 22A can include local memory employed during actual execution of program code, bulk storage, and cache memories which provide temporary storage of at least some program code in order to reduce the number of times code must be retrieved from bulk storage during execution. Further, the computing device 14 is in communication with an external I/O device/resource 28 and a storage system 22B. For example, the I/O device 28 can comprise any device that enables an individual to interact with the computing device 14 or any device that enables the computing device 14 to communicate with one or more other computing devices using any type of communications link. The external I/O device/resource 28 may be keyboards, displays, pointing devices, etc.

In general, the processor 20 executes computer program code, which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the server 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

Automated Transformer

Figure 2:
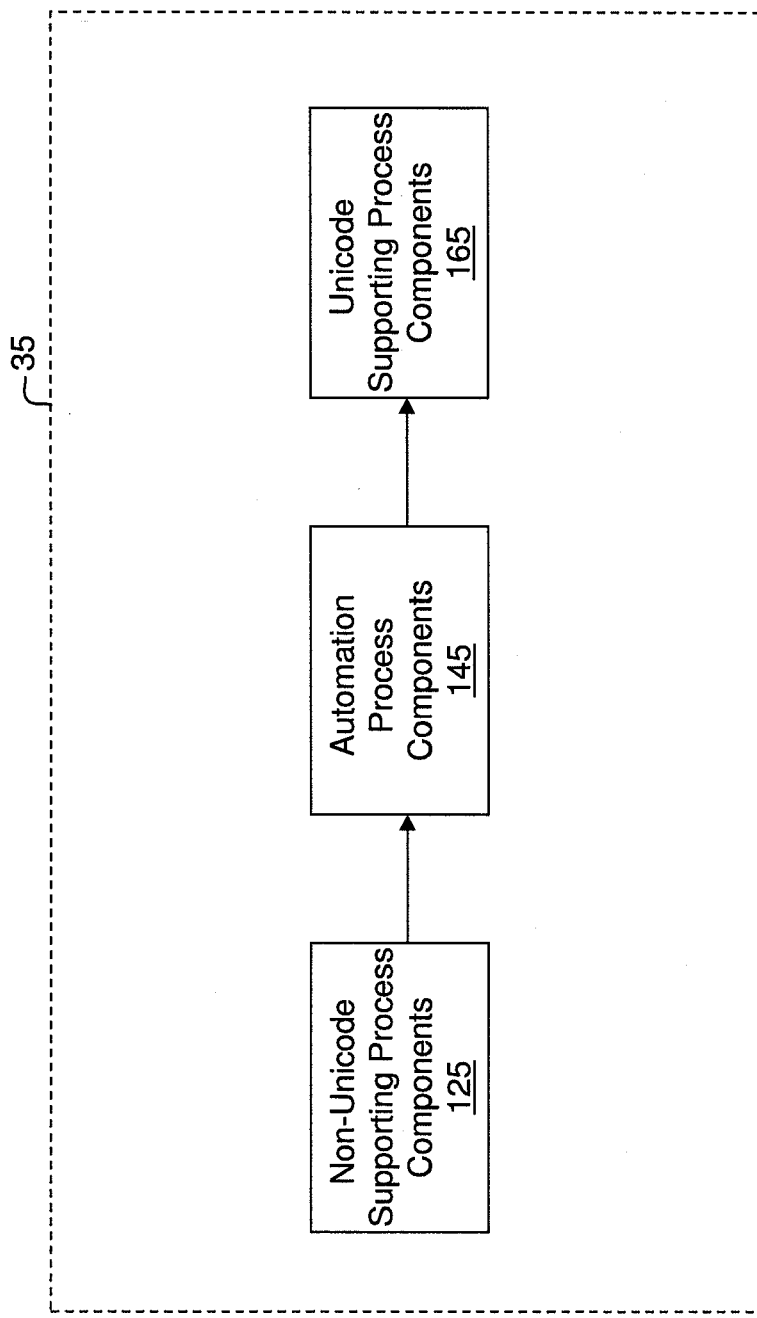
FIG. 2 is a block diagram illustrating components of an automated transformer component in accordance with the invention.

FIG. 2 illustrates the automated transformer 35 in accordance with an aspect of the invention. FIG. 2 can also represent a high level flow diagram implementing processes in accordance with the invention. The automated transformer 35 includes components which are used to transform non-Unicode supporting files into Unicode supporting files. In the illustrated embodiment, three components (and associated processes) are utilized to transform non-Unicode supporting files into Unicode supporting files.

Specifically, a non-Unicode supporting process component 125 is configured to permit non-Unicode data to be entered and non-Unicode data to be outputted. The non-Unicode supporting process component 125 exports source input data and target input data as one or more message transfer service (.MTS) files. This exportation can be done using an import export feature provided by a Type designer/Type importer design tool available in WebSphere™ Transformation Extender's (WTX) design studio, as one example.

Once exported, the source input data and target input data is sent to the automation process component 145, which applies one or more reusable maps to the source input data and target input data. The result is a transformed output source and a transformed output target, which are then exported to the Unicode supporting process component 165. The Unicode supporting process component 165 is configured to receive Unicode input data and output Unicode data. While only three components and specific processes are used in this embodiment of the automated transformer 35, other embodiments may combine processes or add additional processes to implement the automated transformer 35.

Non-Unicode Supporting Process Components

Figure 3:
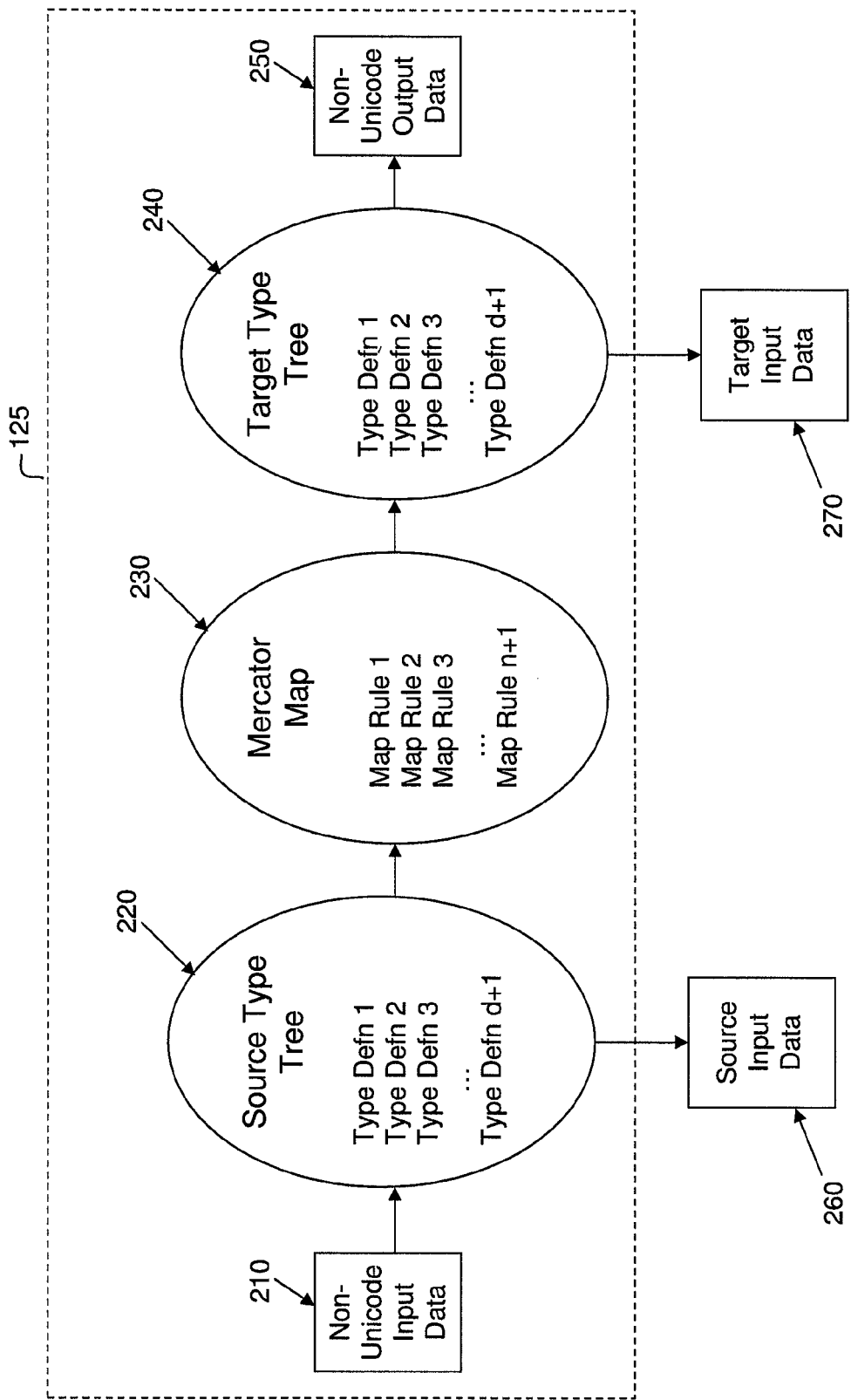
FIG. 3 is a diagram showing a non-Unicode supporting process component in accordance with the invention.

FIG. 3 shows an illustration of a non-Unicode supporting process component 125, in accordance with the invention. In this system, non-Unicode input data 210 is entered into a source type tree 220, wherein one or more Mercator maps 230 are mapped onto the source type tree 220 to produce a target type tree 240. The resulting data from the target type tree 240 is non-Unicode output data 250. More specifically, non-Unicode input data 210, which is in the form of a file or an application, is inputted into the non-Unicode supporting process. Once the file is inputted, the file is parsed to create a source type tree 220. The source type tree 220, as well as the target type tree 240, are designed to receive and handle single byte non-Unicode data.

A type tree, and in particular the source type tree 220, is similar to a data dictionary that defines how types within the tree are classified. A type tree may be defined by describing the syntax, structure, and semantics of the data. All of the document type definitions, or specific rules, that describe the structure of the source type tree 220 can be represented by a one or more schema. More specifically, schema may be used to: define data elements and attributes that appear within a file; explain how the data elements relate to one another; distinguish which types of data are allowed for specific data elements and attributes; and/or define what the default and fixed values are for elements and attributes.

Once the source type tree 220 is parsed, it can then be validated in software or middleware using a validation application, or other existing validation technology known to those of skill in the art, to verify that the parsed input data is valid source data. Whether source data is valid can be determined in a number of different ways depending on the validation technology implemented by the invention. For example, the input data may be validated via a validation parser. In an illustrative embodiment, a parser is used to parse the non-Unicode input data 210 and determine a schema. The schema is then compared to a predetermined schema standard. A predetermined schema standard is a schema that describes the vocabulary, and in particular the semantics, that are supported by the source type tree 220. For example, a predetermined schema standard may be used to determine whether information makes sense given a certain context. If the schema conforms to the predetermined schema standard (i.e., makes sense given the semantics used to comprise the predetermined schema standard) then the non-Unicode input data 210 is valid source data.

If the source type tree 220 does not contain valid source data an error message may occur indicating existing problems with the source data. This error message may, or may not, require a user to specifically handle the problem(s) with the source data. Alternatively, the non-Unicode supporting system may not immediately issue an error, and instead wait to issue a final error report listing all problematic source type trees 220 that occurred during the process of inputting non-Unicode input data 210. In another embodiment, error messages are not generated and the system may continue to input and parse one or more additional source type trees 220 regardless of the previously bad source data.

Once a source type tree 220 is validated as having valid source data, the source type tree 220 goes through a mapping process. The mapping process includes applying one or more map rules associated with one or more Mercator maps 230 to the source type tree 220. The one or more map rules describe how data is transformed and how data is routed. It should be understood by those skilled in the art that different combinations of Mercator maps 230 can be used to transform a source type tree 220. Additionally, Mercator maps 230 can be altered manually or automatically to include or take out rules to permit different mappings. While WebSphere™ Transformation Extender (WTX) Mercator maps are typically used in the mapping process, non-WTX Mercator maps are also contemplated by the invention.

The process of mapping one or more Mercator maps 230 onto a source type tree 220 results in a target type tree 240. The target type tree 240 is substantially similar to the source type tree 220, however, the target type tree 240 includes a transformation as a result of the mapping process. The transformation may be performed on data types, data objects, or other data representations within the schema. However, in the non-Unicode supporting process component, the target type tree 240 maintains the non-Unicode data limitation from the source type tree 220, thereby resulting in non-Unicode output data 250.

It should be understood by those skilled in the art that the non-Unicode supporting system illustrated in FIG. 3 permits non-Unicode input data 210 to be entered and mapped onto non-Unicode output data 250 without having to adjust the underlying architecture of a system having serial linked files or applications. However, an automation process component can also be used to transform the source type tree 220 into a form that is capable of supporting Unicode files without requiring changes in the system architecture.

Automated Process

Figure 4:
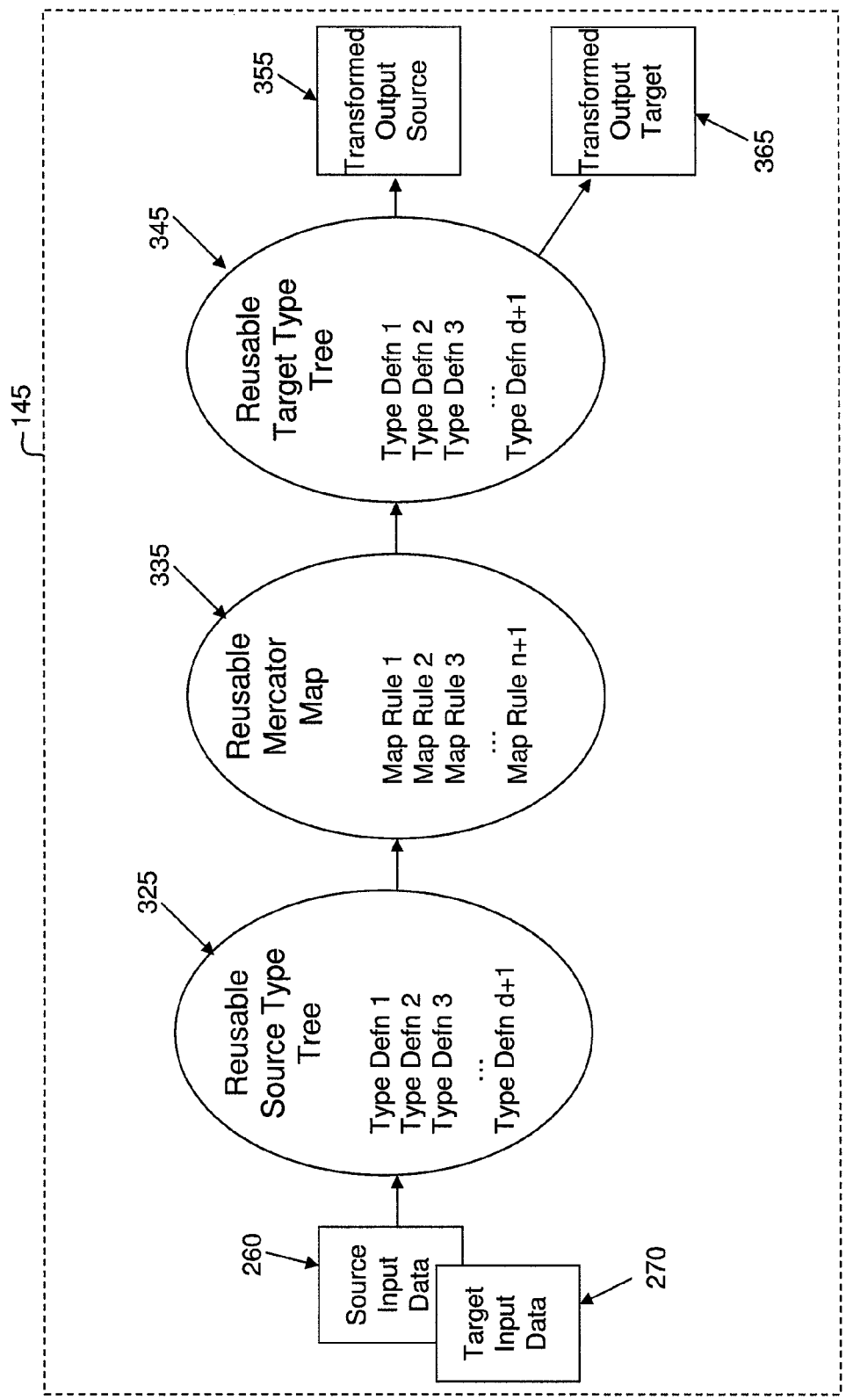
FIG. 4 is a diagram illustrating the automation process component in accordance with the invention.

FIG. 4 illustrates an automation process component 145 in accordance with the invention, whereby source input data 260 and target input data 270 of FIG. 3 are exported from the non-Unicode supporting process component 125 to the automation process component 145. More specifically, referring to FIG. 3, the source input data 260 is exported from the source type tree 220, and is representative of the type tree data that was characterized by the source type tree 220. Additionally, target input data 270 is exported from the target type tree 240. The target input data 270 is representative of the type tree data used by the target type tree 240.

During the exporting process, both the source input data 260 and the target input data 270 are converted to MTS files in extensible markup language (XML) format. However, other embodiments may use a mechanism to export the original files in their original format, or alternatively to change the original files into a different file type and export the file in a different format, or any combination of these alternative embodiments.

The conversion of the source input data 260 and target input data 270 into MTS files may be performed in a number of ways. For example, in one embodiment, the conversion is performed via reverse engineering the original files to convert them into MTS files. The reverse engineering may be performed using existing reverse engineering tools or imported reverse engineering tools that are compatible with the underlying system. In addition to converting files, reverse engineering may also be used to create a new schema from the converted files, or alter part of an existing schema.

Once the source input data 260 and target input data 270 are exported, they are received by the automation process component 145 (see FIG. 4). The source input data 260 and target input data 270 can be imported via a Type designer/Type importer design tool, which is available in WTX design studio and well known to those skilled in the art. As such, further explanation of the Type designer/Type importer is not required for an understanding of the invention. The Type designer/Type importer design tool can also create type trees based on the new schema, which was created from the converted files. These type trees may be reusable or made reusable by making modifications to the type tree.

Modifications may be made for a number of reasons. For example, if the original file did not have the data pertaining to all the types and/or the reverse engineering tool did not have sufficient information, then the schema might not represent the complete type definition. In these cases, a data file that supports all of the types via a current version of a type definition for any specific enterprise application integration (EAI) tool may be used to create a new schema. The new schema may then be used to create a type tree and a reusable type tree. Otherwise if any new data complies with a new type definition that appears in the data file, then the new type definition needs to be introduced by modifying the existing type tree to make it reusable.

Modification may also be made if there is a known product bug or a product upgrade is released. For example, if a product bug is known, then the type designer may generate an incomplete schema or a schema having an incorrectly defined type. If this happens then the type tree may need to be manually modified to correct the type definitions and make them reusable. However, this modification is not required when a fix patch for the bug is released. Another embodiment may modify a type tree when a product upgrade having a new type is released. In such instances, a type tree file may be manually modified to introduce a new type definition before the type tree becomes reusable.

While the Type designer/Type importer design tool is illustrated in this embodiment, it should be understood that other methods of importing the source input data 260 and target input data 270 are also contemplated by the present invention. For example, embodiments may use any importing method that imports a type tree, which correctly and completely complies with a type definition and/or schema that is supported by an EAI tool.

Once the source input data 260 and target input data 270 are imported, the data is transformed in the automation process component 145. It should also be understood that target input data 270 may be transformed similar to source input data 260.

By way of illustration, source input data 260, which is representative of a source type tree 220, is inputted into a reusable source type tree 325. The source data, which is obtained from the source input data 260, is validated by the reusable source type tree's 325 validation process. This validation process is similar to the validation process used by the source type tree 220 during the non-Unicode supporting process. This process may include comparing the schema, which was created from the converted files, to a predetermined schema standard.

Once the source input data 260 is inputted into a reusable source type tree 325, a reusable Mercator map 335 is applied to configure the reusable source type tree 325 to produce a reusable target type tree 345. More specifically, the reusable Mercator map 335 may include of one or more reusable Mercator maps 335, wherein any combination of the one or more reusable Mercator maps 335 may be applied when configuring a reusable source type tree 325. The reusable Mercator maps 335 are designed to process any MTS file.

The reusable Mercator map 335 comprises one or more rules associated with the reusable Mercator map 335. The one or more rules are configured to specifically define the type tree changes required to support a Unicode data transformation, and in particular are designed to follow the specification required to upgrade a WTX type tree to support a Unicode (e.g. UTF-16 BE) transformation. A number of factors are considered in determining what rules, and which reusable Mercator maps 335 associated with the rules, should be applied to transform a reusable source type tree 325 into reusable target type tree 345. These factors include, but are not limited to: determining what type of encoded data is to be supported and, based on that finding, determining the respective portions of the reusable source type tree 325 that need to be changed during the mapping process to obtain a reusable target type tree 345 capable of supporting the encoded data. Once these determinations have been made, one or more appropriate reusable Mercator maps 335, having the one or more rules to perform the desired transformation, are automatically mapped onto the reusable source type tree 325.

During the mapping process, the reusable source type tree 325 is configured by the one or more reusable Mercator maps 325, and results in a transformation of the reusable source type tree 325 into a reusable target type tree 345. The reusable target type tree 345 produced by this transformation meets Unicode requirements.

Once the reusable target type tree 345 is obtained, a transformed output source 355 and transformed output target 365 are outputted to the Unicode supporting process component 165. The transformed output source 355 and transformed output target 365 may be MTS files in XML format, or alternatively, a different file format that is representative of the source input data 260 and source output data 270. It should be understood that the transformed output source 355 and the transformed output target 365 represent transformed type trees that fulfill the requirements to support Unicode processing.

The automation process component 145 described above is designed to automatically perform its associated processes without user intervention. Additionally, features within the automation process component 145 are also designed to be automated. For example, the one or more reusable Mercator maps 335, the reusable source type tree, and/or the reusable target type tree 345 are designed to be automatically upgraded to support changes ranging from generic type changes to map rule changes. Embodiments also permit this automation process to be automated via a recursive automation process.

Users may opt to alter portions of the automation process to provide for a customized mapping process. For example, if a reusable source type tree 325 needs to be transformed via a mapping, yet no reusable Mercator map 335 or combination of Mercator maps 335 exist to perform the mapping, then a user may add additional reusable Mercator maps 335, or alter existing reusable Mercator maps 335, so a mapping can be used to transform the reusable source type tree 325. In an embodiment, all changes made by a user are automatically incorporated into the automation process and applied to subsequent reusable source type trees 325. Additional embodiments permit changes to one or more reusable Mercator maps 335 to be used to update reusable source type trees 325 that have already gone through the mapping process one or more times prior to the user update.

While reusable Mercator maps 335 are structured and arranged to be changed and/or updated by one or more users, the reusable Mercator maps 335 may also be changed and/or updated via other methods. For example, in embodiments, one or more heuristics may be used to determine what type of changes and/or updates need to be made to the Mercator maps 335. Additionally, one or more embodiments may apply artificial intelligence concepts to make changes and/or updates to facilitate effective mappings. For example, a learning algorithm may be employed to track the type of changes and/or updates that are made to the one or more Mercator maps, recognize a pattern existing throughout the changes and/or updates, and apply the pattern to subsequent Mercator maps. This allows otherwise repetitive user changes and/or updates to be avoided.

Additional features, besides the reusable Mercator maps 335, may be automatically changed or updated. For example, in embodiments, the one or more rules can be changed manually or automatically via a script or other mechanism. Embodiments also permit changes and/or updates to be made to the reusable source type tree 325 and/or reusable target type tree 345 to handle source input data 260, target input data 270, and/or to make a source type tree or target type tree more reusable. For example, modifications such as those described above may be used to change and/or update a reusable type tree.

While the automation process may be deployed in a number of ways, the most effective automation processes include those processes that are generic, reusable, and/or efficient given the parameters of the system. Generic and reusable processes are particularly effective because they allow types to be defined without requiring specific detailed definitions of the types. This allows types to be less limited than they would normally be and thereby allows the same type to be used many times without requiring changes and/or updates to the type.

While the automation process provides automatic changes and/or updates to type trees and maps, it should be understood by one skilled in the art that the automation process also eliminates manual error, thereby greatly improving quality within a system.

Unicode Supporting Process

Figure 5:
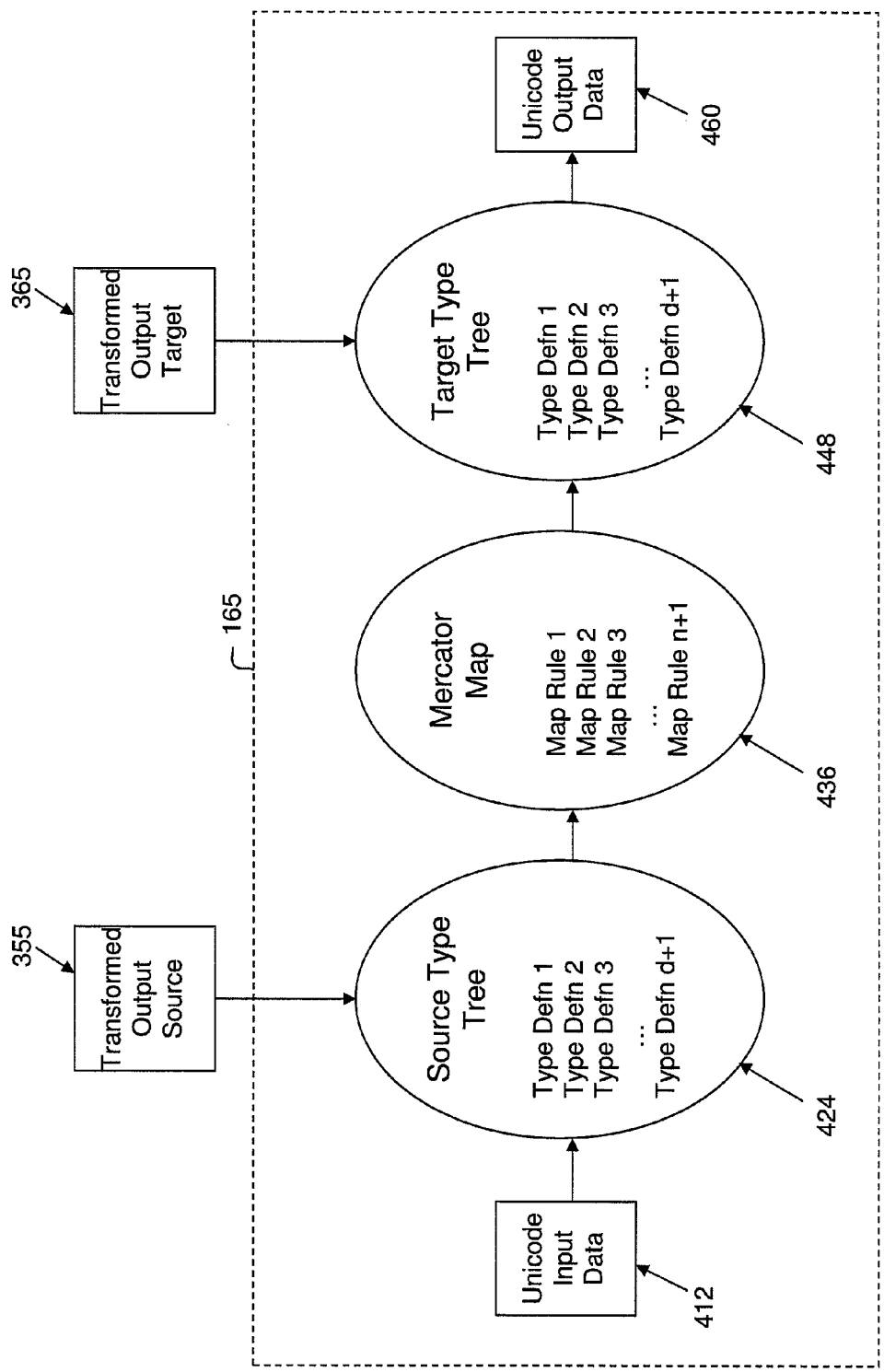
FIG. 5 is a diagram, showing a Unicode supporting process component in accordance with the invention.

FIG. 5 illustrates a Unicode supporting process component 165 in accordance with the invention. The Unicode supporting process component is configured to handle Unicode transformation format (UTF) 16 BE encoding, which is capable of encoding all of the Unicode characters. This component 165 imports the transformed output source 355 and transformed output target 365 from the automation process component 145. It should be understood that the transformed output source 355 and the transformed output target 365 are representative of the reusable target type tree after being transformed via one or more reusable Mercator maps. Therefore, the transformed output source 355 and the transformed output target 365 fulfill the requirements to support Unicode processing. Similarly, the source type tree 424 and the target type tree 448, which are structured to receive the transformed output source 355 and transformed output target 365, fulfill the requirements to support Unicode processing. The transformed output source 355 and transformed output target 365 may be represented in a number of ways, such as MTS files in XML format. Additionally, in embodiments, a reusable type tree may be used as input to the automation process.

After the transformed output source 355 is imported into the source type tree 424, the source type tree 424 is configured by the Mercator map 436 and recompiled so that additional rules associated with the Mercator map 436 can be applied to the source type tree 424 to transform the source type tree 436 to a target type tree 448. While the transformed output source 355 is used for explanatory purposes, it should be understood that the a similar approach is undertaken when importing a transformed output target 365 into a target type tree 448.

It should be understood that the one or more Mercator maps 436 used in the Unicode supporting process component 165 can be the same Mercator maps that were used in the non-Unicode supporting process component 125. Therefore, the automation process component 145 permits Mercator maps, and the corresponding rules, that were used in the non-Unicode supporting process component 125 to be used in the Unicode supporting process component 165.

Once the Unicode supporting process is complete, Unicode input data 412 can be entered into a source type tree 424 and have one or more Mercator maps 436 applied to the source type tree 424 to obtain a target type tree 448. The target type tree 448 then outputs Unicode output data 460, which supports Unicode processing.

Additional Embodiments

The automated transformer mentioned above is particularly useful in upgrading single byte non-Unicode data processing to support double byte Unicode data, e.g. UTF-16 BE encoding. However, it should be understood by those skilled in the art that the automated transformer can be used to convert files for purposes other than meeting Unicode requirements. For example, the automated transformer could be used anytime a number of generic processes need to be performed, such as converting data types.

Additionally, in embodiments, the automated transformer described above is built around the development and reverse engineering features of WTX 8.1, previously known as Mercator Software, to implement non-supported features such as supporting Unicode (UTF-16 BE) data processing. While the automated transformer works with the development and reverse engineering features of WTX, it should be understood that the automated transformer can also be used on platforms utilizing similar features. For example, any WTX or non-WTX product can utilize the automated transformer if the upgrade is consistent and generic in nature, and the product has an export and import feature that enables conversion between the components used to define a schema.

Example

Figure 6:
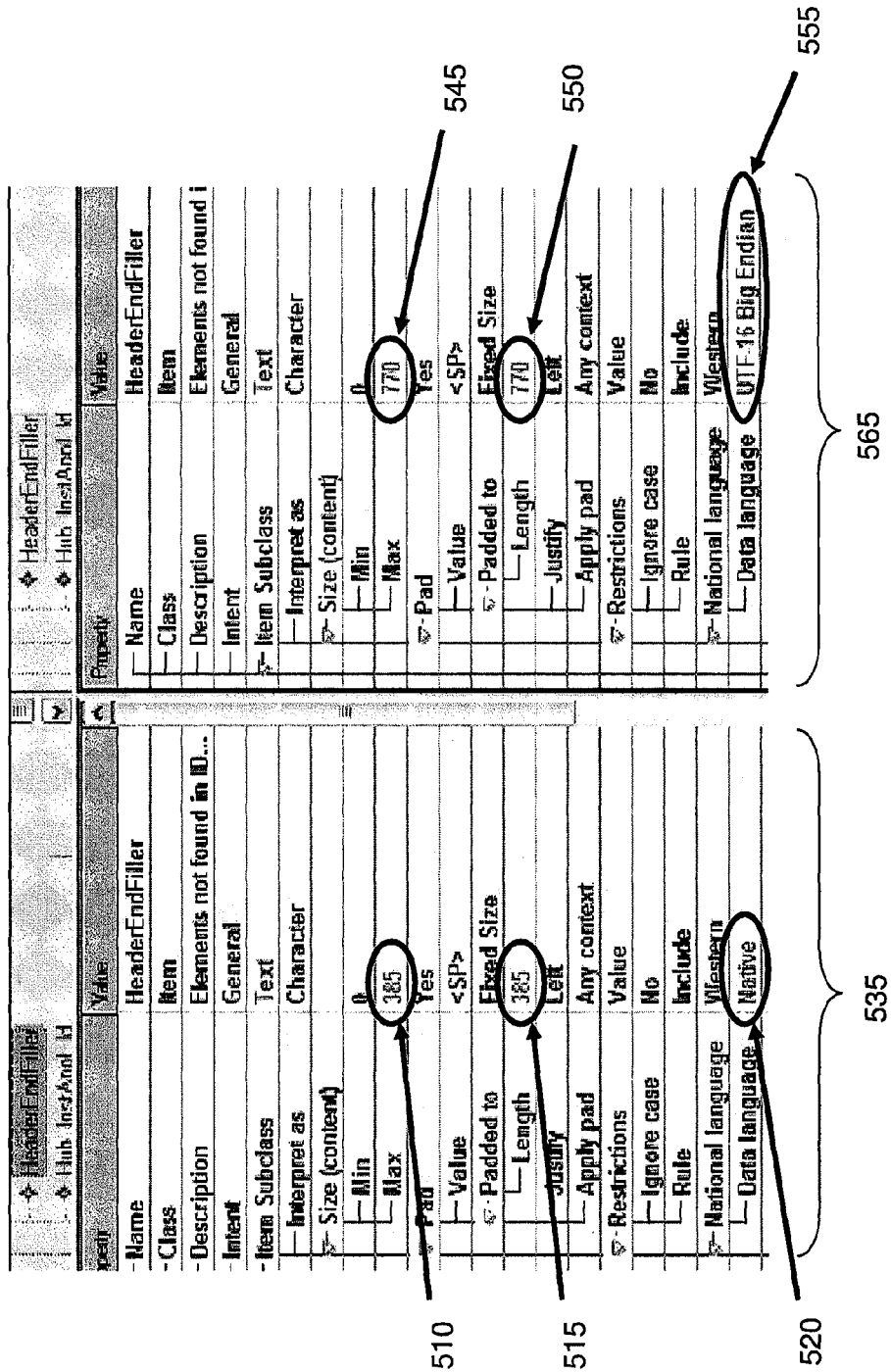
FIG. 6 illustrates a result of a type difference executed on two type trees using WTX 8.1, in accordance with the invention.

FIG. 6 visually represents the result of a type difference executed on two type trees using WTX 8.1, in accordance with an aspect of the invention. More specifically, FIG. 6 illustrates a single byte non-Unicode supporting type tree 535 and a double byte UTF-16 BE Unicode supporting type tree 565. The non-Unicode supporting type tree 535 is illustrative of a type tree that has not been put through an automated transformer, whereas the Unicode supporting type tree 565 is illustrative of a type tree that has been put through an automated transformer. Notable changes that may occur when processed by the automated transformer include how much information a data type can hold and changes in the data language.

For example, an initial non-Unicode supporting type tree 535 may allow for a maximum size 510 capable of holding a single byte of data, whereas the Unicode supporting type tree 565 (which has been processed by the automated transformer) may have a maximum size 545 capable of holding a double byte of data. Additionally, the length 515 in a non-Unicode supporting type tree 535 may be changed by the automated transformer to a length 550 capable of holding a double byte of data. In addition to changes in size and length, the automated process may be used to change the data language from one that does not support Unicode UTF-16 BE 520 to a data language that supports Unicode UTF-16 BE 555.

While the invention has been described in terms of embodiments, those skilled in the art will recognize that the invention can be practiced with modifications and in the spirit and scope of the appended claims.

What is claimed is:

1. A system comprising:
a computing device of a computer infrastructure comprising:
a non-Unicode supporting process component;
an automation process component comprising:
a reusable source type tree organized from a schema, created from a file; and
one or more reusable maps structured to automatically map one or more rules onto the reusable source type tree to transform the reusable source type tree into a reusable target type tree that meets Unicode requirements,
wherein:
the reusable target type tree outputs transformed output source data and transformed output target data, and
the transformed output source data and the transformed output target data are representative of the reusable target type tree and fulfill requirements to support Unicode processing;
a Unicode supporting process component comprising a source type tree and a target type tree, which are structured to receive the transformed output source data and the transformed output target data that support Unicode processing,
wherein the non-unicode supporting process component, the automation process component, and the unicode supporting process component interact to convert non-Unicode files to Unicode files.

2. The system of claim 1, wherein the file is a message transfer service (MTS) file in extensible markup language (XML) format.

3. The system of claim 1, wherein the schema is created by reverse engineering the file.

4. The system of claim 1, wherein the schema creates the reusable target type tree.

5. The system of claim 1, wherein the one or more reusable maps are automatically updated.

6. The system of claim 1, wherein the one or more reusable maps are structured and arranged to be any one of stored, exported, or changed by a system.

7. The system of claim 1, wherein the one or more rules are changeable.

8. The system of claim 1, wherein the file includes an application.

9. The system of claim 1, further wherein the computer infrastructure is configured to support the reusable source type tree, the reusable target type tree, and the one or more reusable maps.

10. A method for transforming files, comprising:
determining whether non-Unicode input data is valid source data;
defining one or more rules to support the non-Unicode input data;
applying the one or more rules automatically to a reusable source type tree to transform the reusable source type tree into a reusable target type tree that meets Unicode requirements;
outputting transformed output source data and transformed output target data that are representative of the reusable target type tree and fulfill requirements to support Unicode processing; and
applying the transformed output source data and the transformed output target data to a source type tree and a target type tree to obtain Unicode output data,
wherein the method transforms non-Unicode files into Unicode files.

11. The method for transforming files of claim 10, further comprising importing the reusable source type tree and the reusable target type tree as one or more MTS files in XML format.

12. The method for transforming files of claim 10, further comprising validating the reusable source type tree as source data before automatically applying the one or more rules.

13. The method for transforming files of claim 10, wherein one or more of the reusable source type tree and the reusable target type tree include a schema.

14. The method for transforming files of claim 10, wherein the steps of claim 10 are executed on a computer infrastructure.

15. A system for deploying an application for converting non-Unicode files to Unicode files, comprising:
a computing device of a computer infrastructure comprising an automated transformer including:
a non-unicode supporting process component that includes a first source type tree and at least one map structured to map at least one rule onto the first source type tree to transform the first source type tree into a first target type tree, wherein non-Unicode input data is input into the first source type tree to obtain the source input data and the target input data is obtained from the first target type tree;
an automation process component that includes a reusable source type tree for receiving the source input data and the target input data and at least one reusable map structured to automatically map at least one rule onto the reusable source type tree to transform the reusable source type tree into the reusable target type tree that meets Unicode requirements, wherein the reusable target type tree outputs transformed output source data and transformed output target data; and
a unicode supporting process component that includes a second source type tree and at least one map structured to map at least one rule onto the second source type tree to transform the second source type tree into a second target type tree, wherein the transformed output source data is input into the second source type tree, and the transformed output target data is input into the second target type tree, and the second target type tree outputs Unicode output data,
wherein:
the transformed output source data and the transformed output target data represent the reusable target type tree and fulfill requirements to support Unicode processing;
the second source type tree and the second target type tree, which are structured to receive the transformed output source data and the transformed output target data support Unicode processing; and
the non-unicode supporting process component, the automation process component, and the unicode supporting process component interact to convert non-Unicode files to Unicode files.

16. The system for deploying an application for converting non-Unicode files to Unicode files of claim 15, wherein the computer infrastructure is at least one of supported, maintained, deployed, and created by a service provider.

17. The system for deploying an application for converting non-Unicode files to Unicode files of claim 16, wherein the service provider offers processes ready on the computer infrastructure as a fee and for subscription basis.

18. A computer program product comprising a computer usable storage medium having computer readable program code embodied in the medium to:

determine whether non-Unicode input data is valid source data;

define one or more rules to support the non-Unicode input data;

create a reusable source type tree from a file;

apply one or more reusable maps having one or more rules onto the reusable source type tree to transform the reusable source type tree into a reusable target type tree that meets Unicode requirements;

output transformed output source data and transformed output target data that are representative of the reusable target type tree and fulfill requirements to support Unicode processing; and apply the transformed output source data and the transformed output target data to a source type tree and a target type tree to obtain Unicode output data, wherein the computer readable program code converts non-Unicode files to Unicode files.

19. The computer program product of claim 18, wherein the reusable source type tree is automatically transformed into the reusable target type tree.

20. A computer system for transforming non-Unicode supporting files into Unicode supporting files, the system comprising:

a CPU, a computer readable memory and a computer readable storage media;

first program instructions to provide a reusable source type tree organized from a schema, created from a file;

second program instructions to provide one or more reusable maps structured to automatically map one or more rules onto the reusable source type tree to transform the reusable source type tree into a reusable target type tree that meets Unicode requirements;

third program instructions to output source data and target data, the source data and the target data being representative of the reusable target type tree and fulfill requirements to support Unicode processing;

fourth program instructions to receive the source data and the target data for Unicode processing; and fifth program instructions to output Unicode data, wherein:

the first, second, third, fourth and fifth program instructions are stored on the computer readable storage media for execution by the CPU via the computer readable memory, and convert non-Unicode files to Unicode files.

* * * * *